United States Patent Office 2,923,697
Patented Feb. 2, 1960

2,923,697

PHENOL-CARBON TETRACHLORIDE BERYLLIUM HALIDE COMPLEX

Alvin Guttag, Bethesda, Md.

No Drawing. Application March 13, 1958
Serial No. 721,096

8 Claims. (Cl. 260—57)

This application is a continuation-in-part of application Serial No. 461,647, filed October 11, 1954, now abandoned.

This invention relates to the reaction of phenol with carbon tetrachloride to form a complex, said complex being a new compound, and to reacting the complex with formaldehyde.

It is an object of this invention to form a new solid compound by reacting phenol with carbon tetrachloride.

It is another object of this invention to devise a novel way of preparing phenol-formaldehyde resins.

A further object is to regulate the reaction rate in forming phenol-formaldehyde resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting 0.3 to 3.0 mols of phenol, 0.3 to 3.0 mols of carbon tetrachloride and 0.01 to 0.9 mol of a beryllium halide per mol of the lesser of the phenol and carbon tetrachloride to form a solid phenol-carbon tetrachloride complex. The reaction is accelerated by the use of heat and, hence, it is preferred to use temperatures between 50° C. and the boiling point. For convenience, the reaction is frequently carried out under reflux at atmospheric pressure.

The preferred catalyst is beryllium chloride, but there can also be used beryllium bromide and beryllium iodide.

It has previously been proposed by Silber, Annales de Chimie, vol. 7, pages 182, 209 and 214, to react phenol with beryllium chloride in the presence of a large excess of benzene or carbon tetrachloride to form the beryllium salt of phenol in almost quantitative yields. The Silber reaction is distinct from the present invention since the carbon tetrachloride is only a solvent and not a reactant in Silber. In the specific example on page 214 of Silber he employed 500 cc. of benzene with 12.5 grams of phenol and 5.2 grams of beryllium chloride. If 500 cc. of carbon tetrachloride were substituted for the benzene in Silber's specific example, there would be utilized 39.8 mols of carbon tetrachloride per mol of phenol which is far outside the range employed in the present invention. In further comparison with Silber, it may be noted that if the reaction product in Example 2 of the present specification were a quantitative yield of beryllium phenate, there would be formed 56.5 grams of product. Actually the product of Example 2 weighed 130 grams and, hence, contained a large amount of carbon tetrachloride (about 73.5 grams).

From the above discussion, it is evident that the proportions recited in the instant specification are critical in order to form the complex of the present invention containing carbon tetrachloride in excess rather than forming a simple beryllium phenate.

This solid complex appears to be unique with phenol; it is not formed when benzene or toluene is substituted for the phenol. Thus, when 101.9 grams (1.31 mols) of benzene were mixed with 44.1 grams (0.051 mol) of beryllium chloride and 200 cc. of carbon tetrachloride, there was no reaction, even after heating for several hours at reflux temperature.

Similarly, when 84.7 grams (1.12 mols) of toluene, 4.9 grams (0.061 mol) of beryllium chloride and 200 cc. of carbon tetrachloride were refluxed for slightly over 2 hours, there was no reaction.

*Example 1*

| | |
|---|---|
| Phenol | 44.3 grams (0.471 mol). |
| Beryllium chloride | 24.5 grams (0.306 mol). |
| Carbon tetrachloride | 150 cc. (0.96 mol). |

The mixture was stirred at room temperature for 2½ hours. The temperature was then raised to 68 to 70° C. and kept there for another 1½ hours. The original, thin liquid became quite viscous and white in color. The liquid was removed by filtration. The residue which weighed about 100 grams was white in color but rapidly turned a reddish-purple in the air. It was treated with distilled water with which it reacted slowly. Then, a small amount of concentrated hydrochloric acid was added. The water layer was removed from a lower organic layer. This lower layer was distilled and the fraction boiling at 66 to 115° C. at atmospheric pressure was discarded. The residue was distilled at 50 mm. pressure. It all distilled at 102 to 104° C., at that pressure which showed that it was phenol. The phenol and carbon tetrachloride thus combined in the presence of the beryllium chloride to give a relatively stable complex which can be broken up slowly in the presence of water or more rapidly in the presence of acid.

*Example 2*

| | |
|---|---|
| Phenol | 51.9 grams (0.552 mol). |
| Beryllium chloride | 22.7 grams (0.284 mol). |
| Carbon tetrachloride | 175 cc. (1.12 mol). |

The mixture was heated with stirring during the course of ¾ hour while it came to a boil. It was then filtered and the grayish-white solid allowed to dry. The solid weighed 130 grams. The greater part of this was placed in a dessicator where it was stable for several months. A small portion was exposed to air and it gradually lost carbon tetrachloride and turned pink. The grayish-white solid gave no indication of melting or decomposing when placed in a melting point tube and heated gradually to 300° C. The presence of beryllium chloride may account for this latter observation.

The grayish-white solid phenol-carbon tetrachloride complex was non-crystalline and crumbled like clay when squeezed in the hand. No phenol burns were observed when it was held for some time in the hand.

This new phenol-carbon tetrachloride complex has a number of uses. Thus, it can be used as a source of phenol wherever it is desired to control a reaction in which phenol reacts violently. As the break-up of the complex is gradual, the reaction of phenol with the other reactant can readily be controlled. Thus, for example, 100 grams of the complex (containing 28.5 grams of phenol) was reacted with 25 cc. of 40% formalin at reflux temperature for 60 minutes to give a novolak. The carbon tetrachloride and water were removed by distillation in a vacuum (water pump) until the temperature of the mixture reached 90° C. The novolak can then be mixed with wood flour and sufficient hexamethylene tetramine to give an excess of formaldehyde to cure the novolak in the usual way. Instead of formalin, if a slower reaction rate is desired, neutral aqueous formaldehyde can be used. The water present aids in the break-up of the complex and the gradual release of hydrochloric acid through hydrolysis of the beryllium chloride in the complex. The beryllium chloride in the complex thus acts as a latent catalyst. If it is desired to speed up the reaction by breaking the complex more rapidly, this can be accomplished by adding a strong acid, such as hydrochloric acid or sulfuric acid in varying amounts, depending on the speed with which it is desired to break up the complex.

Conventional thermosetting resins can also be made by adding an excess of formaldehyde and alkaline catalyst. In this case, insoluble beryllium hydroxide will form and it can be left in the resin as a filler.

I claim:

1. A solid complex reaction product prepared by condensing at a temperature of between 50° C. and the boiling point 0.3 to 3.0 mols of phenol, 0.3 to 3.0 mols of carbon tetrachloride and 0.01 to 0.9 mol of beryllium chloride per mol of the lesser of the phenol and carbon tetrachloride, said reaction product being characterized by being capable of decomposing to reform the phenol, carbon tetrachloride and hydrolysis products of beryllium chloride in the presence of water and aqueous acid.

2. The process comprising reacting at a temperature of between 50° C. and the boiling point 0.3 to 3.0 mols of phenol, 0.3 to 3.0 mols of carbon tetrachloride and 0.01 to 0.9 mol of a beryllium halide per mol of the lesser of the phenol and the carbon tetrachloride to form a solid complex reaction product, said reaction product being capable of decomposing to reform the phenol, carbon tetrachloride and hydrolysis products of beryllium halide in the presence of water and aqueous acid.

3. The process comprising reacting a solid phenol-carbon tetrachloride-beryllium chloride complex made by heating at a temperature from 50° C. to the boiling point 0.3 to 3.0 mols of phenol, 0.3 to 3.0 mols of carbon tetrachloride and 0.01 to 0.9 mol of beryllium chloride per mol of the lesser of the phenol and carbon tetrachloride with aqueous formaldehyde to form a phenolformaldehyde resin, said phenol being phenol per se.

4. A solid complex reaction product made by condensing at a temperature of between 50° C. and the boiling point phenol, 0.01 to 0.9 mol of beryllium chloride per mol of phenol and more than 1 mol of carbon tetrachloride up to 3 mols per mol of phenol.

5. A process according to claim 2 including the additional step of reacting the phenol-carbon tetrachloride-beryllium halide complex with aqueous formaldehyde to form a phenol-formaldehyde resin, said phenol being phenol per se.

6. A process according to claim 2 wherein the beryllium halide is beryllium chloride.

7. A solid complex reaction product prepared by condensing at a temperature of between 50° C. and the boiling point 0.3 to 3.0 mols of phenol, 0.3 to 3.0 mols of carbon tetrachloride and 0.01 to 0.9 mol of a beryllium halide per mol of the lesser of the phenol and carbon tetrachloride.

8. A solid complex reaction product prepared by condensing at a temperature of between 50° C. and the boiling point 0.552 mol of phenol, 0.284 mol of beryllium chloride and 1.12 mol of carbon tetrachloride.

References Cited in the file of this patent

UNITED STATES PATENTS

| | | |
|---|---|---|
| 2,171,207 | Boultbee | Aug. 29, 1939 |
| 2,222,012 | Amos et al. | Nov. 19, 1940 |
| 2,835,714 | Nixon et al. | May 20, 1958 |

OTHER REFERENCES

Silber: "Annales de Chimie," vol. 7 (1952), pages 182 and 209.

Chatfield: "Varnish Constituents," Leonard Hill, London (1953), pages 292–295.

Merck Index, 6th ed., 1952, page 109, Merck & Co., N.J.